(12) United States Patent
Limano

(10) Patent No.: US 6,930,272 B1
(45) Date of Patent: Aug. 16, 2005

(54) VISE FOR HOLDING A WORKPIECE ON AN EDM MACHINE

(76) Inventor: Michael P. Limano, 751 Pine St., Meadville, PA (US) 16335

( * ) Notice: Subject to any disclaimer, the term of this patent is extended or adjusted under 35 U.S.C. 154(b) by 108 days.

(21) Appl. No.: 10/884,274

(22) Filed: Jul. 6, 2004

(51) Int. Cl.[7] .......................... B23H 7/02; B23Q 3/06; B25B 1/10; B25B 1/24
(52) U.S. Cl. .................... 219/69.12; 269/240
(58) Field of Search .................. 219/69.12, 69.11; 269/240, 241, 242

(56) References Cited

U.S. PATENT DOCUMENTS

| | | | |
|---|---|---|---|
| 1,659,528 A | | 2/1928 | Hosterman |
| 1,823,537 A | | 9/1931 | Gaudreau |
| 2,364,150 A | | 12/1944 | Lowenstein .................... 77/63 |
| 3,584,862 A | * | 6/1971 | Wilson ........................ 269/242 |
| 3,668,366 A | | 6/1972 | Gerber et al. ............... 219/158 |
| 3,806,691 A | | 4/1974 | Roach .......................... 219/69 |
| 4,139,189 A | | 2/1979 | Wietrzyk ..................... 269/272 |
| 4,222,354 A | | 9/1980 | Uitvlugt .................. 123/90.16 |
| 4,518,155 A | * | 5/1985 | Lehmann ..................... 269/60 |
| 4,583,432 A | | 4/1986 | Bricker ........................ 82/1 C |
| 4,819,924 A | * | 4/1989 | Yang .......................... 269/241 |
| 4,925,168 A | * | 5/1990 | Ramsbro .................... 269/136 |
| 5,019,129 A | | 5/1991 | Johanson ..................... 269/71 |
| 5,095,635 A | | 3/1992 | Iwasaki ....................... 33/644 |
| 5,438,178 A | | 8/1995 | Buhler et al. ............ 219/69.12 |
| 5,487,538 A | | 1/1996 | Tibbet ......................... 269/71 |
| 5,595,377 A | | 1/1997 | Tibbet ......................... 269/71 |
| 6,091,041 A | | 7/2000 | Lai ......................... 219/69.11 |
| 6,103,987 A | | 8/2000 | Nordquist ............... 219/69.12 |
| 6,179,279 B1 | | 1/2001 | Asai et al. .................. 269/164 |
| 6,254,077 B1 | | 7/2001 | Riley, Jr. .................... 269/287 |

FOREIGN PATENT DOCUMENTS

| | | | |
|---|---|---|---|
| GB | 2327633 A | * 2/1999 | |
| JP | 02001113430 A | 4/2001 | ........... B23Q 3/06 |
| JP | 02001138154 A | 5/2001 | ........... B23Q 3/06 |

* cited by examiner

*Primary Examiner*—Geoffrey S. Evans
(74) *Attorney, Agent, or Firm*—Wayne L. Lovercheck

(57) ABSTRACT

A vise for holding a work piece in position on an EDM machine includes a main plate for attachment to the rail or ledge of the EDM machine, and the main plate supports a vise that holds the work piece in position during the machining process. The vise includes a movable jaw adjustable in the x direction and a solid jaw for clamping and holding the work piece therebetween. Both jaws include undercuts adjacent the work area of the vise, and the jaws define a clearance pocket so that the discharge wire can be moved to the work position adjacent the work piece. The solid jaw also provides a fixed and repeatable locating surface for the discharge wire so that the discharge wire can use the solid jaw to establish a reference point wherein the discharge wire touches off the solid jaw in order to move the discharge wire to the work position. The vise also includes an alignment and stopping device for maintaining the repeatability of location of the work piece in the vise in the y direction as the work piece may be removed from the vise for checking and then returned a number of times during the machining process. The alignment and stopping device is mounted to the solid jaw and has an adjustment rod that extends between the jaw for providing an exact stopping point against which the work piece abuts.

29 Claims, 4 Drawing Sheets

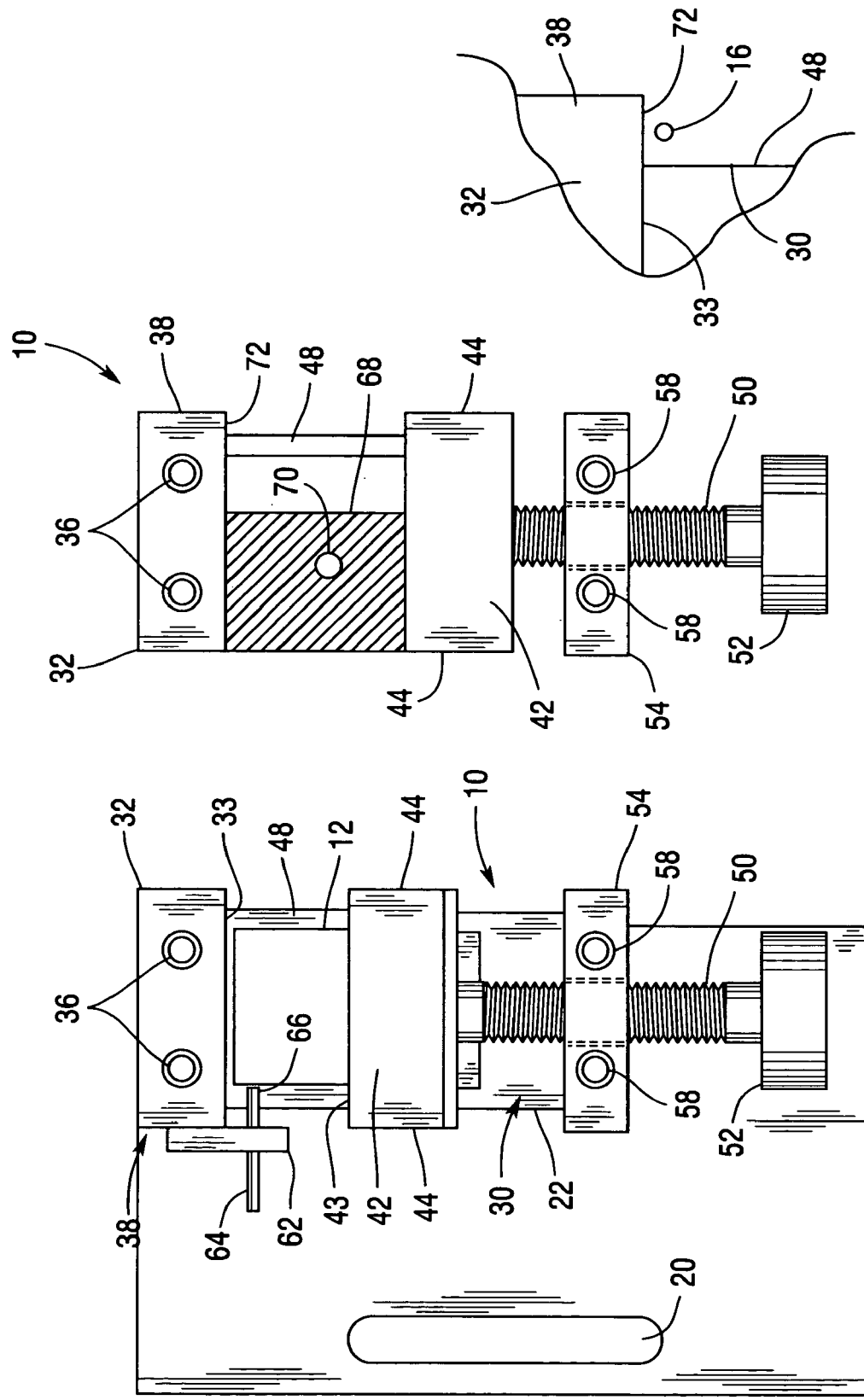

VISE FOR HOLDING A WORKPIECE ON AN EDM MACHINE

FIELD OF THE INVENTION

The present invention pertains to work piece holding assemblies, and more particularly pertains to a vise that allows for the positioning of the discharge wire of an EDM machine relative to the work piece by using features of the vise to obtain maximum repeatability in the positioning and alignment of the work piece.

BACKGROUND OF THE INVENTION

As the demand for complex machined parts has dramatically increased in recent years, technology has evolved to create such intricate and precise parts. One technology that is now widespread for creating such intricate and precise parts is the technology known as "wire electrostatic discharge machining (wire EDM)." This technology permits the machining of complicated geometric shapes from hard and difficult to cut electrically conductive materials.

Wire EDM is used for cutting and shaping many types of material such as sheet metal parts. The wire EDM uses a small diameter wire that moves like the blade in a band saw, except that the wire is discarded after one pass through the work. The wire is supported above and below the work piece and is fed from above the work piece to below as machining of the work piece proceeds. As the sheet of metal moves automatically in response to a NC (numerical control) program, the electrical discharge moves atoms of the metal from the work piece to the wire in a kind of reverse welding process. An EDM rough cut may take between eight and 12 hours with the wire moving only a few thousandths of a millimeter at a time. The finer the pass of the wire, the faster the wire moves; and thus the wire is continuously moving past the work piece. This degrades the wire the longer a portion of the wire is maintained in spark gap contact with the work piece. For thick work pieces the accuracy of the rough pass will degrade along with the wire as the wire moves past the work piece thereby requiring more skim passes. In addition to shaping sheet metal, wire EDM is also used in the finishing processes for various types of plastic forming molds, press casting molds, forging molds, etc.

One of the most critical factors in the wire EDM process is properly locating and positioning the work piece on or within the fixture, plate, or work platform at what is referred to as "the working origin" so that alignment precision can be maintained throughout the wire EDM process. Moreover, it is often necessary to remove the work piece for temporary checking and inspection; and then the work piece must be returned to the fixture with no loss of alignment precision either by the work piece or the wire. Most tooling currently available utilizes a type of 3 axes positioning and adjustment (the x, y, and z axes). This is a useful feature when used in mass production runs; however, when applied to the production of precision parts, the problem of accurate repeatability in alignment and positioning of the work piece and the discharge wire arises. Thus, the prior art reveals a range of devices, assemblies, and techniques for locating, positioning and aligning the work piece and the discharge wire. The problem of obtaining exact repeatability in locating the work piece is often is due to the fact that leveling (of the work piece on the fixture and the fixture with respect to the machine rail) is accomplished by the use of jackscrews or cams. The fact that the fixture holding the work piece is not directly attached to the machine rail creates certain variables that affect repeatability in the positioning of the work piece.

For example, the Johanson Patent (U.S. Pat. No. 5,019,219) discloses a work piece holding system that includes opposed vises that exert a downward force to the work piece, and the vises include dovetail recesses for holding tall or elongate work pieces.

The Buhler et al. Patent (U.S. Pat. No. 5,438,178) discloses a method of precision electric-discharge machining wherein a wire electrode is used for producing at least one finishing stroke on a work that has already been roughed out at least once.

The Tibbet Patent (U.S. Pat. No. 5,487,538) discloses a work piece holding assembly for holding a work piece that includes a rail clamp, a beveled head and a beveled rail that adjustably interconnect for mounting to a machine table in order to hold the work piece.

The Iwasaki Patent (U.S. Pat. No. 5,095,635) discloses a positioning block for the wire of an NC wire electro-spark processing machine that includes a block that is used to determine the position of the discharge wire in the coordinate system in which the table and the work piece move.

The Tibbet Patent (U.S. Pat. No. 5,595,377) discloses a work piece presetting assembly that includes a subassembly for precisely aligning a work piece to be worked on along predetermined orthogonal axes.

The Lai Patent (U.S. Pat. No. 6,091,041) discloses an electric discharge machine that includes a movable work platform for supporting a cylindrical work piece so that the work piece can be flattened for finishing by a discharge finishing electrode.

The Nordquist Patent (U.S. Pat. No. 6,103,987) discloses a retaining plate for a machine tool work piece that includes at least one opening for receiving the work piece and sections that allow for the transference of the retaining plate without losing alignment precision.

The Asai et al. Patent (U.S. Pat. No. 6,179,279 B1) discloses a gripping device for holding a work piece that includes a movable block disposed between fixed blocks with the movable block and at least one fixed block capable of holding irregular-shaped work pieces.

Nonetheless, despite the ingenuity of the above devices there remains a need for an assembly for use with a wire EDM machine that can maintain extremely close tolerances and that permits removal of the work piece from the fixture for checking and evaluation, so that the return of the work piece to the fixture can be done with maximum repeatability to the exact location on the fixture.

SUMMARY OF THE INVENTION

The present invention comprehends a vise for holding a work piece in position on an EDM machine that maintains extremely close tolerances by allowing for the removal of the work piece being machined from the vise for checking, and then placement back on the vise with maximum repeatability in the alignment and position of the work piece.

The vise of the present invention includes a base or main plate that is securable to a ledge or rail of the EDM machine. The main plate includes an intermediate support member that is mounted on the main plate generally on the portion of the main plate opposite of where the main plate attaches to the edge of the worktable or the rail of the EDM machine. Mounted on the intermediate member is a movable jaw and a solid (fixed) jaw. The movable jaw is reciprocably movable, positionable, and repositionable along the intermediate plate in the x direction. A threaded screw attaches to the movable jaw and is manually rotatable by the operator turning a knob attached to the distal end of the screw. Both the movable jaw and the solid jaw include undercuts at their respective opposed ends for allowing the discharge wire of the EDM machine to be moved into a clearance pocket located between the jaws for allowing the wire to use the solid jaw as a point of reference for locating the wire in the x direction as part of the process of moving the wire to a work position relative to the work piece. The vise also includes a locating and stopping device attached to the solid jaw and opposite of the work area for the discharge wire. The locating and stopping device includes an adjustment rod that extends through the locating and stopping device transverse to the intermediate support member and in what is defined as the y direction. The position of the adjustment rod between the solid and movable jaw can be fixed so that the convex end of the rod contacts the work piece when the work piece is placed between the movable and solid jaw thereby providing for the repeatable positioning of the work piece in the y direction and preventing any further lateral movement of the work piece.

It is an object of the present invention to provide a vise for holding a work piece on an EDM machine wherein the jaws of the vise are undercut so that the discharge wire can be positioned with respect to the work piece in the x direction by contacting and moving off of the stationary jaw.

It is another object of the present invention to provide a vise for holding a work piece on an EDM machine that provides for an unobstructed clearance pocket for the discharge wire to facilitate machining of the work piece.

It is yet another object of the present invention to provide a locating device that is securable to the stationary jaw for allowing repeatability of positioning and alignment of the work piece in the y direction.

It is still yet another object of the present invention to provide a vise for holding a work piece on an EDM machine having an upper surface that is parallel to the work table of the EDM machine so that the workpiece can be removed for inspection and then returned to the vise whereupon the workpiece will remain parallel to the x-axis.

Still yet another object of the present invention is to provide a vise for holding a work piece on an EDM machine wherein at least one of the jaws of the vise can be used to establish a point of reference to properly locate the discharge wire with respect to the work piece.

Still yet a further object of the present invention is to provide a vise for holding a work piece on an EDM machine that includes an unobstructed clearance pocket to allow for the machining of very small parts.

A still yet further object of the present invention is to provide a vise for holding a work piece on an EDM machine that obviates the need to employ x, y and z adjustment mechanisms for consistently and accurately locating the work piece on the vise by employing solid surfaces of the fixture to locate and retain the work piece.

Yet another object of the present invention is to provide a vise for holding a work piece on an EDM machine that allows for repeatability of positioning in the y direction because the work piece is placed against the solid stationary jaw of the vise.

Yet still another object of the present invention is to provide a vise for holding a work piece on an EDM machine that has the ability to constantly repeat and hold dimensions thereby avoiding the drawback of having to remove extra stock from the work piece in a separate operation.

Yet still a further object of the present invention is to provide a vise for holding a work piece on an EDM machine that allows for the removal of the work piece from the fixture for checking dimensional accuracy on the first machined part, and then the return to the fixture thereby saving time as it is not necessary to indicate and check for dimensional accuracy for every subsequent machined part.

These and other objects, features and advantages will become apparent to those skilled in the art upon a perusal of the following detailed description read in conjunction with the accompanying drawing Figures.

BRIEF DESCRIPTION OF THE DRAWINGS

FIG. 6 is a top plan view of the vise first shown in FIG. 1 illustrating the placement of the vise on the main plate;

FIG. 7 is a top plan view of the vise first shown in FIG. 1 illustrating the placement of the work piece between the movable jaw and the solid jaw;

FIG. 8 is a sectioned top plan view of the vise first shown in FIG. 1 illustrating the use of the solid jaw to establish a reference point for the discharge wire;

DETAILED DESCRIPTION OF THE PREFERRED EMBODIMENT

Illustrated in FIGS. 1 through 10 is a vise 10 for gripping and holding a work piece 12 in position on the worktable, station or assembly of an EDM machine 14 (shown schematically in FIG. 9) so that the machining of work piece 12 can be effected by a discharge wire 16 that is supported above and below work piece 12 by the EDM machine and that is run by EDM machine 14. Vise 10 is mounted to the edge of the worktable of EDM machine 14 so that vise 10 can extend into the work area of EDM machine 14. As will be hereinafter described, vise 10 can be mounted in both a horizontal and a vertical orientation with respect to EDM machine 14.

Figure 1:
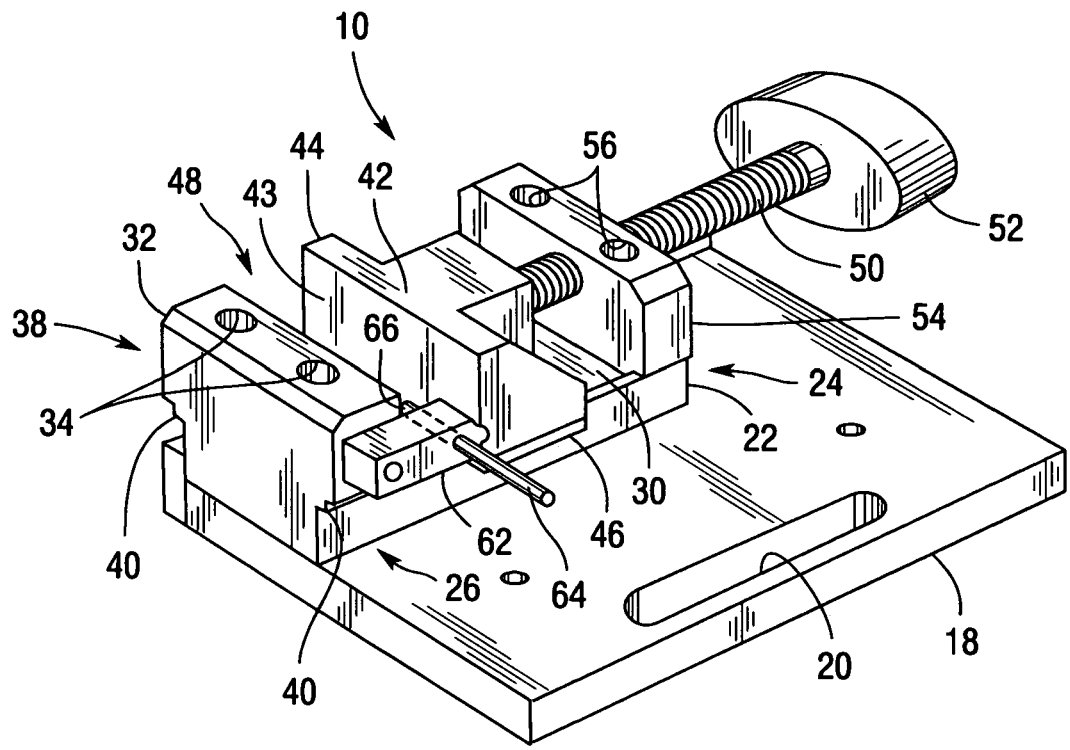
FIG. 1 is a perspective view of the vise of the present invention.
Figure 9:
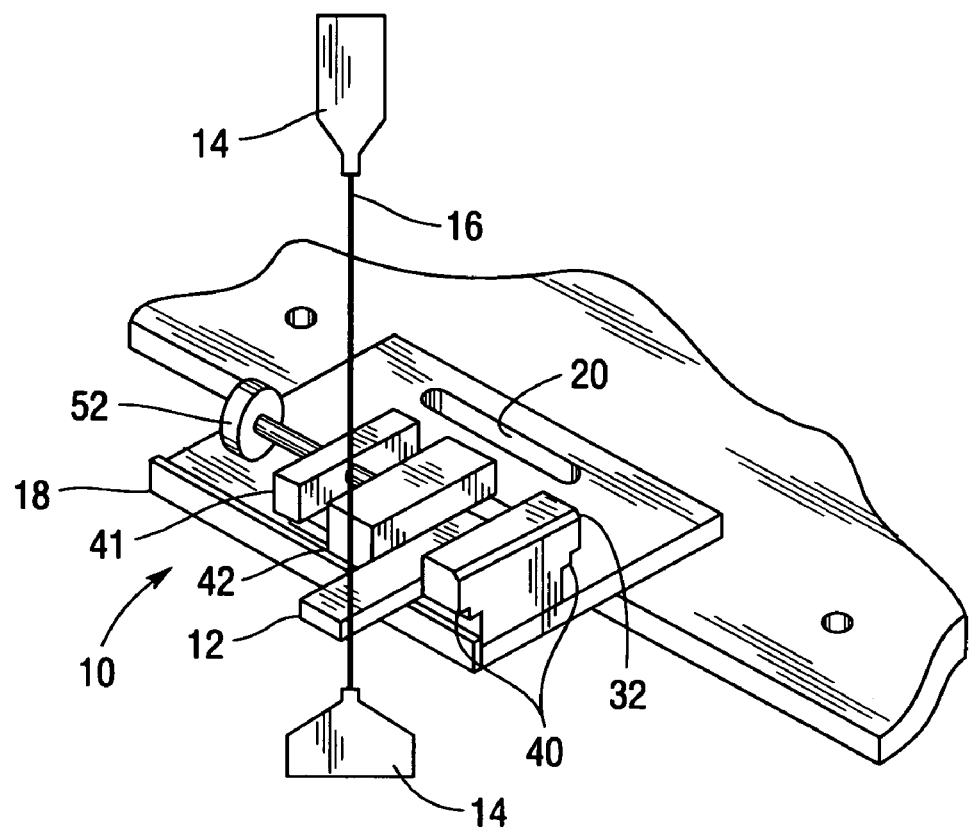
FIG. 9 is a perspective view of the vise first shown in FIG. 1 illustrating the disposition of the work piece with respect to the discharge wire during the machining process.

As shown in FIGS. 1, 6, and 9, vise 10 includes a base or main plate 18 that is removably mountable to the worktable, and, for the present embodiment, mountable to the edge of the worktable. Main plate 18 includes at least one elongated slot 20 through which bolts can be inserted for securing main plate 18 to the worktable of EDM machine 14. As shown in FIGS. 1 through 6, and 9, an intermediate support member 22 is secured on main plate 18. Intermediate support member 22 is disposed parallel with main plate 18, and includes a first end 24, a second end 26, a lower surface 28 disposed contiguous to main plate 18 and an opposite upper surface 30. Work piece 12 rests upon upper surface 30 as shown in FIGS. 6 and 9.

In order to grip and hold work piece 12 in position on upper surface 30 of intermediate support member 22, and also to allow the release of work piece 12 for checking, measuring and evaluation during the machining process, vise 10 utilizes a pair of opposed jaws. Specifically, as shown in FIGS. 1 through 7, and 9 and 10, vise 10 includes a rectangular-shaped solid jaw 32 fixedly mounted on upper surface 30 adjacent second end 26 of intermediate support member 22. Solid jaw 32 includes a flat interior surface 33 for engaging work piece 12, and a pair of spaced bolt holes 34 for receiving bolts 36 that fasten solid jaw 32 to intermediate support member 22 and main plate 18. Solid jaw 32 includes opposed end portions 38 that extend past upper surface 30 of intermediate support member 22; thus, the width of solid jaw 32 is greater than the width of intermediate support member 22. The extension of end portions 38 of solid jaw 32 creates undercuts 40, with an undercut 40 formed at each end portion 38.

In addition to solid jaw 32, vise 10 includes a movable jaw 42, and movable jaw 42 and solid jaw 32 cooperate to selectively grip, hold and release work piece 12, and also to facilitate the positioning of discharge wire 16 relative to work piece 12 and the movement of discharge wire 16 to the work position as will be hereinafter explained. Movable jaw 42, as shown in FIGS. 1 through 7, and 9 and 10, is generally rectangular-shaped and is disposed on upper surface 30 of intermediate support member 22 for slidable reciprocable movement thereon to or away from solid jaw 32. The slidable movement of movable jaw 42 is defined as being in the x direction or axis that is parallel to upper surface 30 of intermediate support member 22. Movable jaw 42 also includes a flat interior surface 43 for engaging work piece 12, and opposed end portions 44 that also extend past or beyond upper surface 30 of intermediate support member 22, and thus the width of movable jaw 42 is greater than the width of intermediate support member 22. Opposed end portions 44 of movable jaw 42 define undercuts 46 that facilitate the positioning and locating of discharge wire 16 with respect to work piece 12 to be machined. Undercuts 40 and 46 of both solid and movable jaw 32 and 42 allow for the flat jaw surfaces to be used to establish points of reference for initially positioning discharge wire 16, and then touching off discharge wire 16 for moving wire 16 to the work position for machining work piece 12.

As shown most distinctly in FIGS. 1, 2, 6, and 7, a space is defined between the portions of solid jaw 32 and movable jaw 42 that extend past the worktable of EDM machine 14 in the area where the machining of work piece 12 occurs. The space created is an unobstructed clearance pocket 48 wherein the machining occurs, and the length of clearance pocket 48, as determined along the y direction, is proportional to the gap or opening formed by the distance that separates movable jaw 42 from solid jaw 32 in any given machining operation. In conjunction with that portion of upper surface 30 between solid jaw 32 and movable jaw 42, and on which work piece 12 is placed and supported for machining, clearance pocket 48 defines a y direction or axis that is perpendicular to the x direction and transverse to upper surface 30 of intermediate support member 22.

As shown in FIGS. 1 through 7, and 9 and 10, vise 10 includes an incremental means to slide movable jaw 42 along upper surface 30 toward solid jaw 32 for contacting and holding work piece 12 between solid jaw 32 and movable jaw 42, and for moving movable jaw 42 away from solid jaw 32 for releasing work piece 12. The incremental adjustment means includes a threaded screw 50 that is spaced from upper surface 30 and extends parallel thereto for attachment to the rear of movable jaw 42. Threaded screw 50 includes a hand graspable knob 52 that can be manually rotated for moving movable jaw 42 to the desired gripping and holding position and to the desired release position—positions that are dependent on the configuration of the work piece and the steps or requirements of the given machining process.

Threaded screw 50 is supported in its extension above upper surface 30 by an intermediate support block 54 that is mounted to upper surface 30 of intermediate support member 22 and to main plate 18. Support block 54 includes a pair of spaced through holes 56 for receiving bolts 58 that connect support block 54 to main plate 18. Support block 54 also includes a centrally located threaded aperture 60 through which threaded screw 50 extends and which provides an annular threaded surface against which threaded screw 50 mates and rotates.

Figure 2:
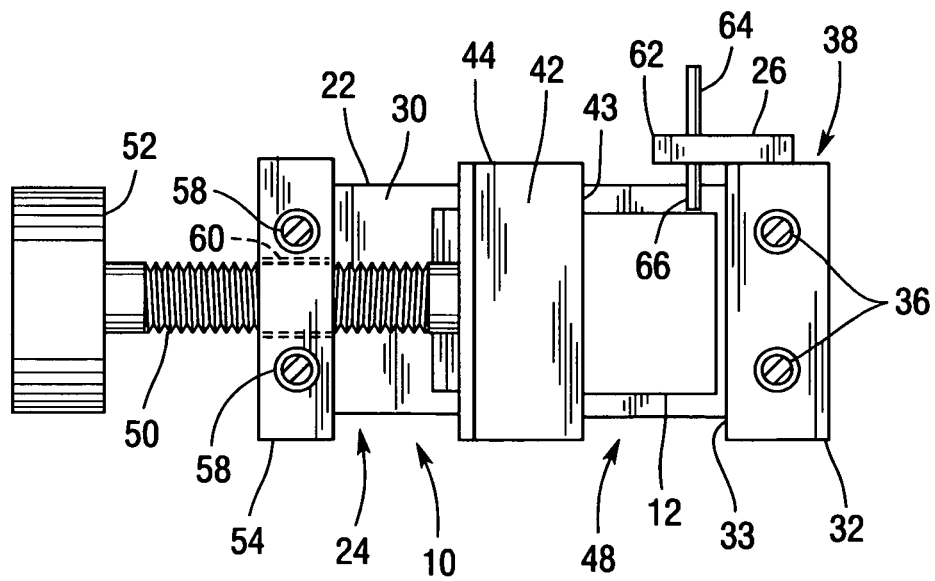
FIG. 2 is a top plan view of the vise of the present invention.
Figure 3:
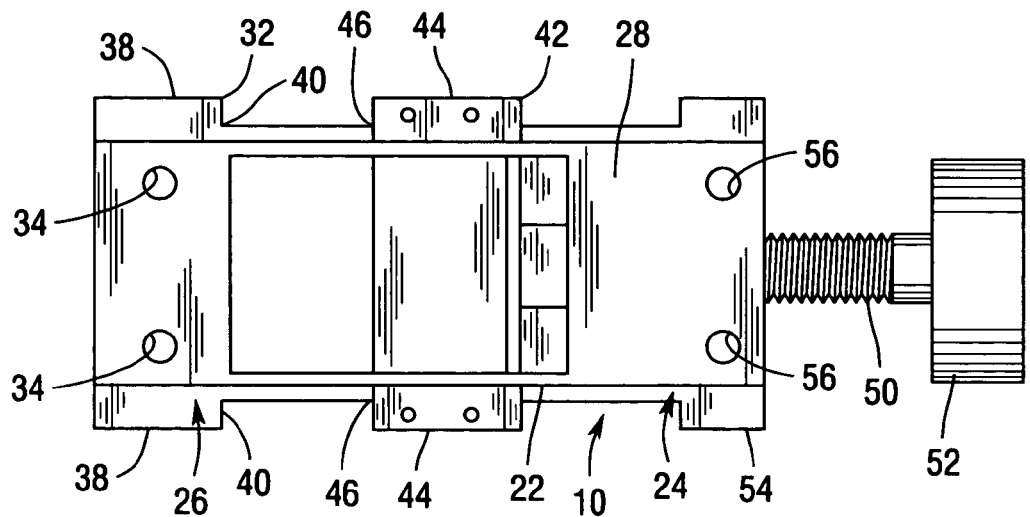
FIG. 3 is a bottom plan view of the vise of the present invention.
Figure 4:
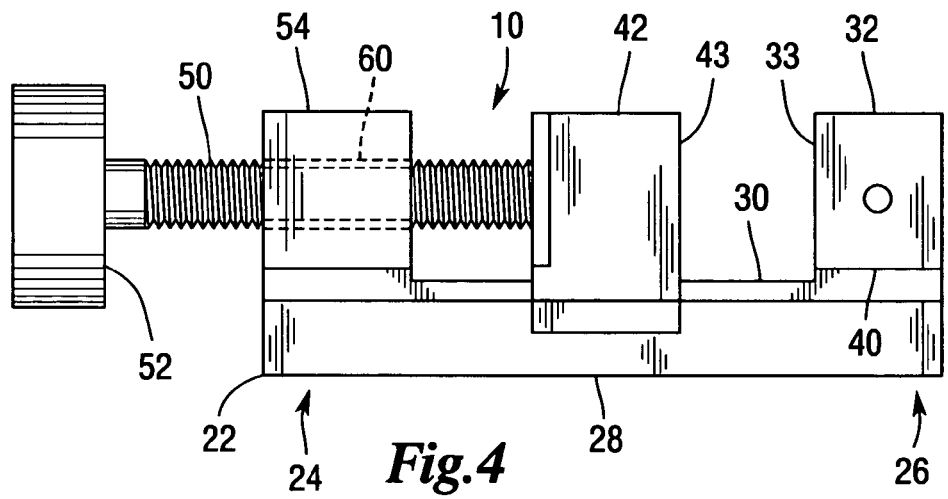
FIG. 4 is a left side elevational view of the vise of the present invention.
Figure 5:
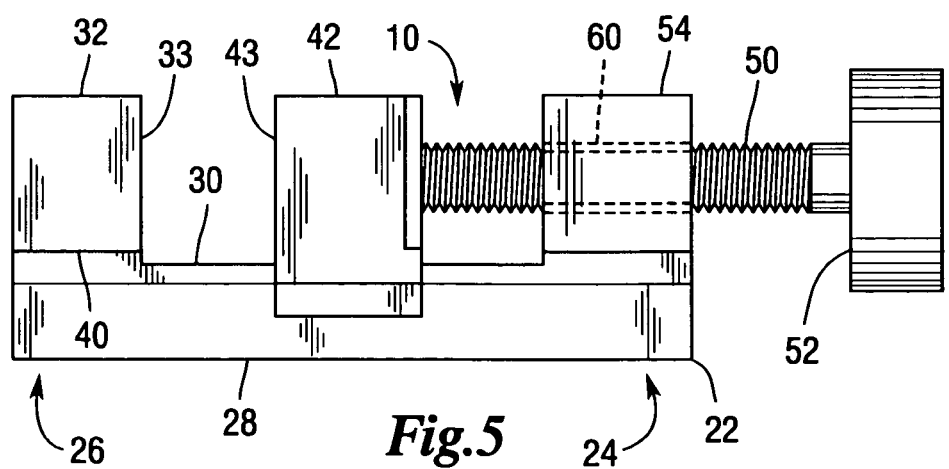
FIG. 5 is a right side elevational view of the vise of the present invention.

In order to provide for the repeatability of locating or positioning work piece 12 in the y direction, and for maintaining and holding the required dimensions and tolerances so that work piece 12 can be removed from jaws 32 and 42 for checking and then returned to the exact same location, vise 10 includes a locating means that cooperates with solid jaw 32 and movable jaw 42. FIGS. 1, 2, and 6 illustrate a locating means that is an alignment and stopping device 62 removably securable to one end portion 38 of solid jaw 32 opposite of clearance pocket 48 and the working area of discharge wire 16. Stopping device 62 is secured to flat end portion 38 of solid jaw 32 and mounted and extending through stopping device 62 is an adjustment rod 64. Adjustment rod 64 extends through stopping device 62 transverse to upper surface 30 of intermediate support member 22 and coincident with the y-axis. Adjustment rod 64 can be selectively linearly adjusted on stopping device 62 for contacting work piece 12, and can be fixed in the desired position by tightening a setscrew that extends through stopping device 62 and against rod 64. Adjustment rod 64 includes a generally convex work piece contacting end 66 that abuts work piece 12 at a single point of contact. Once adjustment rod 64 is fixed in position, lateral movement of work piece 12 in the y direction is prohibited while maximum repeatability of positioning work piece 12 in the y direction is obtained.

With work piece 12 placed against solid jaw 32, and held between movable jaw 42 and solid jaw 32, thus fixing the location of work piece 12 in the x direction; and with convex end 66 of adjustment rod 64 abutting working piece 12, thus fixing work piece 12 in the y direction, maximum repeatability in locating of work piece 12 on upper surface 30 and holding of dimensions is obtained. The cooperation of solid jaw 32, movable jaw 42 and stopping device 62 allows for the constant repetition in positioning in the exact location, and the holding of dimensions, of work piece 12. Work piece 12 can now be removed from vise 10 for checking, and then returned back to vise 10, any number of times to exactly the same position on vise 10. Vise 10 of the present invention also allows the operator to approach very close tolerances, and minimize out of tolerance parts, as well as eliminate extra machining costs involved, for example, removing grind stock that is an additional machining operation.

Moreover, undercuts 40 and 46 of jaws 32 and 42 that are adjacent the work area, and clearance pocket 48, allow the operator to use solid jaw 32 to first establish a reference point for positioning discharge wire 16 before moving discharge wire 16 to the work position. Thus, as shown in FIGS. 7 and 8, a work piece 68 is shown held between movable jaw 42 and fixed jaw 32 and which requires, for example, that a hole 70 be machined in an exact location, but work piece 68 doesn't extend past end portion 38 of solid jaw 32 that is adjacent the work area. Discharge wire 16 is unable to initially contact work piece 38 in the x direction, wire 16 travels in the x direction for contacting or "touching off" interior surface 33 of solid jaw 32 to establish a reference point. Undercuts 40 and 46 of jaws 32 and 42 allow wire 16 to "touch off" solid jaw 32, and then after that reference point is established from contact with solid jaw 32, wire 16 can be further moved in the appropriate x and y direction to the work position for machining work piece 68.

Figure 10:
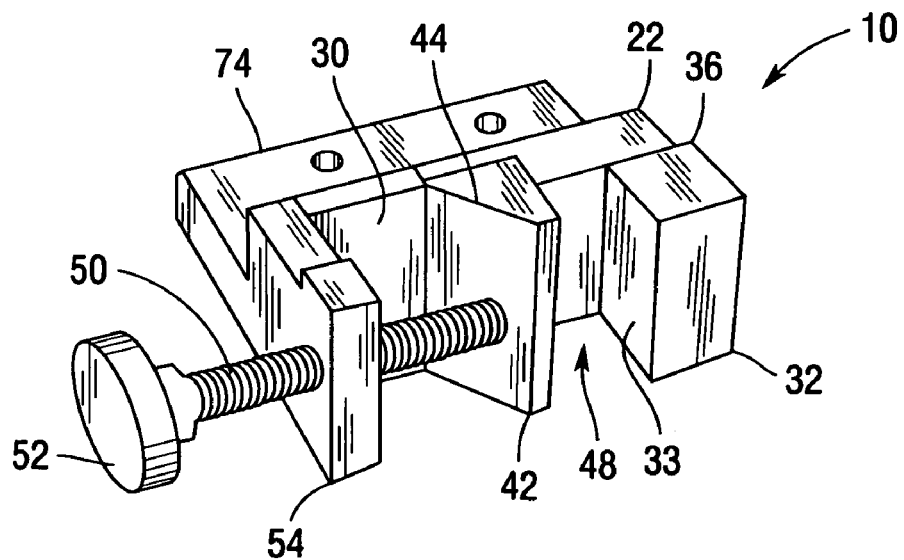
FIG. 10 is a perspective view of the vise first shown in FIG. 1 illustrating the orientation of the vise for vertically mounting the vise to the worktable of the EDM machine.

FIG. 10 illustrates the orientation of vise 10 when vertically mounted as vise 10 shown in FIGS. 1 through 9 is horizontally mounted to the worktable by main plate 18. A vertical mounting plate 74 is used with vise 10 to vertically mount vise 10, and vertical mounting plate 74 is attachable to intermediate support member 22. Thus, vise 10 of the present invention has the capability of being either horizontally or vertically mounted to the worktable of EDM machine 14.

While the invention has been described with respect to a preferred embodiment, it will be clear to those skilled in the art that numerous modifications, alterations, and variations are possible and practicable without departing from the spirit and scope of the invention as the invention is not to be limited by the specific illustrative embodiments, but only by the scope and spirit of the appended claims.

I claim:

1. A vise for holding a work piece in position on the worktable of an EDM machine so that the discharge wire of the EDM machine can be located adjacent the work piece and moved to the work position for machining the work piece, the vise comprising:
   a main plate for attachment to the worktable of the EDM machine;
   an intermediate support member mounted on the main plate and parallel therewith, the intermediate support member having a lower surface and an opposite upper surface for supporting the work piece thereon;
   a solid jaw mounted on the upper surface of the intermediate support member, and the solid jaw having opposed end portions that extend past the intermediate support member thus forming solid jaw undercuts that allow the solid jaw to be used as a reference point for the discharge wire in order to locate and move the discharge wire to the work position relative to the work piece;
   a movable jaw mounted on the intermediate support member for reciprocable movement in the x direction toward the solid jaw for holding the work piece between the solid jaw and the movable jaw and away from the solid jaw to allow for the removal of the work piece, the movable jaw having opposed end portions that extend past the intermediate support member creating movable jaw undercuts that facilitate the locating of the discharge wire to the work position with respect to the work piece;
   a clearance pocket formed between the movable jaw and the solid jaw into which the discharge wire can be moved for machining the work piece;
   an alignment and stopping device attachable to the solid jaw for contacting the work piece and fixing the position of the work piece within the jaws in the y direction for obtaining repeatability of the positioning of the work piece in the y direction; and
   the movable and solid jaw cooperating with the alignment and stopping device for obtaining repeatability of location for the work piece in the x and y directions and the undercuts of the movable jaw and the solid jaw allowing the discharge wire to use the solid jaw to establish a reference point by contacting the solid jaw and then moving the discharge wire to the work position adjacent the work piece.

2. The vise of claim 1 wherein the upper surface of the intermediate support member supports the work piece for machining by the discharge wire of the EDM machine.

3. The vise of claim 2 wherein the upper work surface of the intermediate support member is parallel with the main plate.

4. The vise of claim 3 further comprising a manually rotatable threaded screw attachable to the movable jaw and coaxial with the x direction of the main plate for slidably moving the movable jaw toward the solid jaw for gripping and holding the work piece and for slidably moving the movable jaw away from the solid jaw for releasing the work piece.

5. The vise of claim 4 wherein the threaded screw includes a hand graspable knob to facilitate the rotation of the screw and the slidable movement of the movable jaw.

6. The vise of claim 5 further comprising an intermediate support block mounted on the intermediate support member between the movable jaw and the knob and through which the threaded screw extends so that the threaded screw can be supported thereon.

7. The vise of claim 6 wherein the alignment and stopping device includes an adjustment rod extending through the alignment and stopping device linearly adjustable in the y direction between the movable and solid jaw and against which the work piece abuts for providing repeatability of locating of the work piece in the y direction and for preventing lateral movement of the work piece in the y direction.

8. The vise of claim 7 wherein the main plate is secured to the edge of the worktable of the EDM machine so that the jaws of the vise extend past the worktable to facilitate the positioning of the discharge wire between the jaws and adjacent the work piece.

9. The vise of claim 8 wherein the cooperation of the movable jaw, the solid jaw, the adjustment rod and the upper surface of the intermediate support member allows for the repeated removal and return of the work piece to the same exact position on the upper surface of the intermediate support member and between the solid and movable jaw.

10. A vise for holding a work piece on an EDM machine so that the discharge wire of the EDM machine can be repeatably positioned adjacent the work piece, the vise comprising:
    a main plate for attachment to the worktable of the EDM machine;
    an intermediate support member mounted on the main plate and parallel thereto, the intermediate support member having a lower surface and an opposite upper surface upon which the work piece is placed;
    a solid jaw mounted on the upper surface of the intermediate support member and having opposed end portions that extend beyond the intermediate support member thus forming opposed solid jaw undercuts that allow the solid jaw to be used as a reference point for the discharge wire for moving of the discharge wire to the work position adjacent the work piece;
    a movable jaw mounted on the upper surface of the intermediate support member for reciprocable movement in the x direction toward the solid jaw for holding the work piece between the solid jaw and the movable jaw and movable away from the solid jaw to allow for the removal of the work piece, the movable jaw having opposed end portions that extend past the intermediate support member forming undercuts that facilitate the locating of the discharge wire adjacent the work piece;

an alignment and stopping device attachable to the solid jaw for contacting the work piece and fixing the position of the work piece within the jaws in the y direction so that repeatability of positioning of the work piece in the y direction can be obtained; and the movable and solid jaw cooperating with the alignment and stopping device so that repeatability of location for the work piece in the x and y directions can be attained and the undercuts of the movable jaw and the solid jaw allowing the discharge wire to use the solid jaw to establish a reference point by contacting the solid jaw and then moving the discharge wire to the work position adjacent the work piece.

11. The vise of claim 10 further comprising a clearance pocket formed between the movable jaw and the solid jaw and into which the discharge wire can be positioned for machining the work piece.

12. The vise of claim 11 wherein the upper surface of the intermediate support member supports the work piece for machining by the discharge wire of the EDM machine.

13. The vise of claim 12 wherein the upper surface of the intermediate support member is disposed parallel to the main plate.

14. The vise of claim 13 further comprising a manually rotatable threaded screw attachable to the movable jaw and coaxial with the x direction of the main plate for slidably moving the movable jaw toward the solid jaw so that the work piece can be gripped and held by the movable jaw and the slidable jaw and for moving the movable jaw away from the solid jaw to release the work piece.

15. The vise of claim 14 wherein the threaded screw includes a hand graspable knob to facilitate the rotation of the threaded screw and the slidable movement of the movable jaw upon the upper surface.

16. The vise of claim 15 further comprising an intermediate support block mounted on the upper surface of the intermediate support member and between the movable jaw and the knob and through which the threaded screw extends so that the screw thread can be supported thereon.

17. The vise of claim 16 wherein the alignment and stopping device includes an adjustment rod extending through the alignment and stopping device that is linearly adjustable in the y direction between the movable jaw and the solid jaw and against which the work piece abuts for providing repeatability of location for the work piece in the y direction and for preventing lateral movement of the work piece in the y direction.

18. The vise of claim 17 wherein the main plate is secured to the edge of the worktable of the EDM machine so that the jaws of the vise extend past the worktable to facilitate the positioning of the discharge wire between the jaws and adjacent the work piece.

19. The vise of claim 18 wherein the cooperation of the movable jaw, the solid jaw, the adjustment rod and the upper surface of the intermediate support member allows for the repeated removal and return of the work piece to the same exact position on the upper surface of the intermediate support member between the solid jaw and the movable jaw.

20. A vise for holding a work piece in position on an EDM machine, comprising:

a main plate for attachment to the worktable of the EDM machine;

an intermediate support member disposed on the main plate and parallel thereto, the intermediate support member having a lower surface and an opposite upper surface on which the work piece rests during machining;

a solid jaw mounted upon the upper surface of the intermediate support member and having opposed end portions that extend beyond the intermediate support member thereby forming opposed solid jaw undercuts that allow the discharge wire to use the solid jaw as a reference point for positioning the discharge wire adjacent to the work piece in the work position;

a movable jaw mounted upon the upper surface of the intermediate support member for reciprocable movement in the x direction toward the solid jaw for holding the work piece between the solid jaw and the movable jaw and movable away from the solid jaw to allow for the removal of the work piece, the movable jaw having opposed end portions that extend past the intermediate support member that forms undercuts to facilitate the positioning and movement of the discharge wire to the work position adjacent the work piece; and the movable jaw and the solid jaw cooperating so that repeatability of location for the work piece can be attained and the undercuts of the movable jaw and the solid jaw permitting the discharge wire to use the solid jaw to establish a reference point by contacting the solid jaw and then moving the discharge wire to the work position adjacent the work piece.

21. The vise of claim 20 further comprising a clearance pocket formed between the movable jaw and the solid jaw and into which the discharge wire can be positioned for machining the work piece.

22. The vise of claim 21 further comprising an alignment and stopping device mountable to the solid jaw for abutting and fixing the position of the work piece within the jaws in the y direction for attaining the repeatability of positioning of the work piece in the y direction.

23. The vise of claim 22 wherein the upper surface of the intermediate support member is disposed parallel to the main plate.

24. The vise of claim 23 further comprising a manually rotatable threaded screw attachable to the movable jaw and coaxial with the x direction of the intermediate support member for slidably moving the movable jaw toward the solid jaw so that the work piece can be gripped and held by the movable jaw and the slidable jaw and for moving the slidable jaw away from the solid jaw for releasing the work piece from the jaws.

25. The vise of claim 24 wherein the threaded screw includes a hand graspable knob to facilitate the manual rotation of the threaded screw.

26. The vise of claim 25 further comprising an intermediate support block mounted on the upper surface of the intermediate support member and between the movable jaw and the knob and through which the threaded screw extends for supporting the longitudinal extension of the threaded screw.

27. The vise of claim 26 wherein the alignment and stopping device includes an adjustment rod extending through the alignment and stopping device and linearly adjustable in the y direction between the movable jaw and the solid jaw and against which the work piece abuts thereby providing for repeatability of location for the work piece in the y direction and for preventing lateral movement of the work piece on the upper surface of the intermediate support member.

28. The vise of claim 27 wherein the main plate is secured to the edge of the worktable of the EDM machine so that the jaws of the vise extend past the worktable to facilitate the positioning of the discharge wire between the jaws and adjacent the work piece.

29. The vise of claim 28 wherein the cooperation of the movable jaw, the solid jaw, the adjustment rod and the upper surface of the intermediate support member allows for the repeated removal and return of the work piece on the upper surface to the same exact location.

* * * * *